C. R. DAVIS.
STRAW SPREADER.
APPLICATION FILED MAR. 5, 1913.
1,124,711.
Patented Jan. 12, 1915.
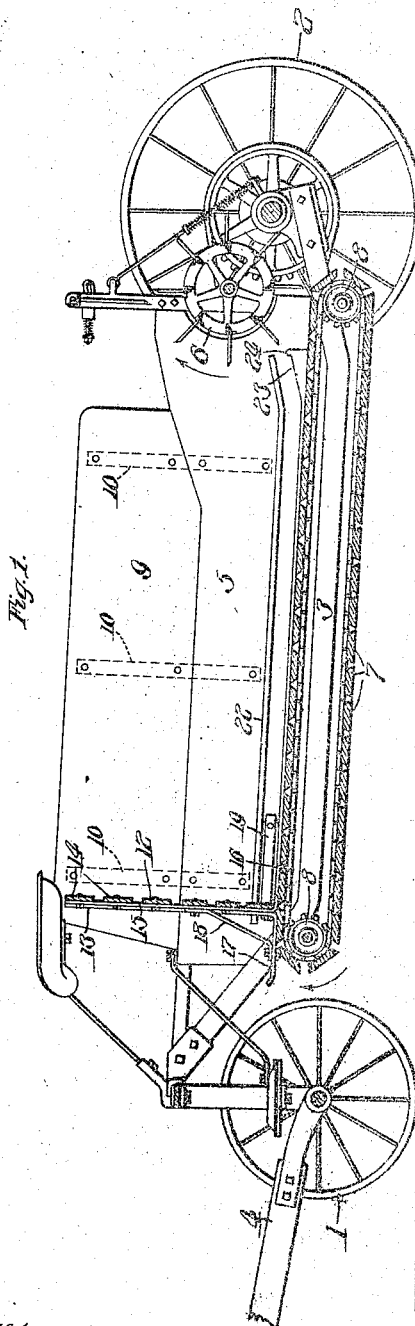
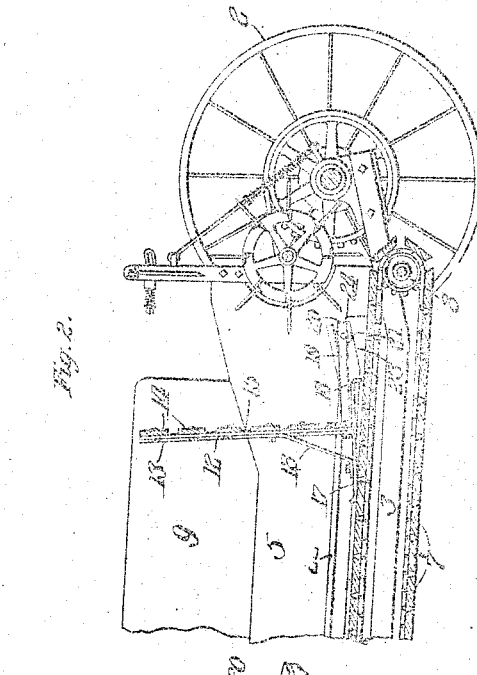
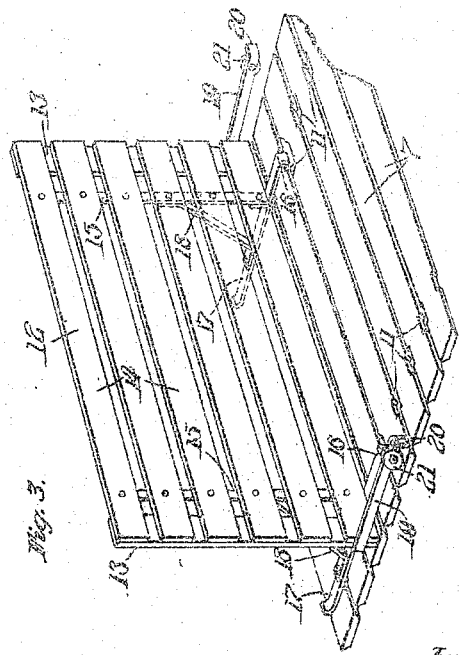

UNITED STATES PATENT OFFICE.

CALVIN R. DAVIS, OF CHICAGO HEIGHTS, ILLINOIS, ASSIGNOR TO EMERSON-BRANTINGHAM COMPANY, OF ROCKFORD, ILLINOIS, A CORPORATION OF ILLINOIS.

STRAW-SPREADER.

1,124,711.

Specification of Letters Patent.

Patented Jan. 12, 1915.

Application filed March 5, 1913. Serial No. 752,114.

*To all whom it may concern:*

Be it known that I, CALVIN R. DAVIS, a citizen of the United States, residing at Chicago Heights, in the county of Cook and State of Illinois, have invented certain new and useful Improvements in Straw-Spreaders, of which the following is a specification.

This invention relates to spreaders, and more particularly to those adapted to distribute and spread straw, chaff, etc.

The object of this invention is to construct such a spreader having means adapted to feed a load of straw to the rear of the spreader, the straw to be distributed by means located at the rear of the spreader. I accomplish this object by providing an end rack to travel with the endless apron of a spreader, the apron and end-rack feeding the load of straw to distributing means at the rear of loader and means for stopping the feed of said end-rack when it has come within a certain proximity of the distributing means, while not interfering with the movement of said apron.

The further object is to construct straw spreading means which shall be adapted to be attached to a fertilizer distributer of the low-down type, thereby making the fertilizer distributer easily converted into a straw spreader.

In the accompanying drawings, Figure 1 shows a longitudinal section through a spreader of a desirable type and illustrating the application of my straw spreading means thereto. Fig. 2 is a similar view of the rear end of said spreader with the end-rack moved to an inoperative position. Fig. 3 is a perspective view of the end-rack, showing its connection with the feed apron.

In the accompanying drawings, I have illustrated a fertilizer distributer of the low-down type but the straw spreading means may be attached to and used with any other variety of distributer.

The fertilizer distributer comprises front and rear carrying wheels 1 and 2 respectively, a frame 3 carried thereby, draft means 4, receptacle-sides 5, and a rotatable beater 6 positioned at the rear of the receptacle and adapted to be rotated by any suitable means generally through traction of the rear wheels as I have shown, the relation of such a beater being a well known expedient in the art of fertilizer distributers. An endless apron comprising a plurality of links 7 is carried by sprocket wheels 8, the apron being adapted to be rotated in any suitable manner so that when the spreader is in motion, the apron may be set in motion at the will of the operator. Extension sides 9 are secured to the receptacle-sides 5 by bars 10 (shown dotted) bolted thereto, the extension of the sides of the spreader-box being necessary because of the bulky condition of straw, and in order to carry a reasonable load. Notches 11 are formed in each link 7 at each end thereof and equi-distant from the ends thereof, as shown in the perspective view. An end-rack 12 is provided, adapted to fit within the sides of the spreader-box, to serve as an end thereto, and may be of a suitable construction, having here shown the rack comprising vertical supports 13 carrying a plurality of cross-strips 14. Strips 15 are bolted to the cross-bars 14, are bent horizontal at the lower ends and are formed with depending ends 16 forming catches adapted to engage notches 11 in links 7.

Supporting-straps 17 are bolted to the end-rack, extending to the side opposite said catch members, are each formed with an up-turned end and are braced by the links 18. Roller-supports 19 are secured to each lower end of the end-rack, have an out-turned end 20 and carry rollers 21 which are adapted to run within a track or guide 22 formed on the inner side of each side 5, and to each track, at the ends nearest the beater 6 is formed a rise of cam face 23 terminating in a stop 24.

To be operated, the end-rack is positioned as shown in Fig. 1, at the forward end of the spreader-box, the spreader-box is filled with straw, and when the spreader is being driven over a field, the apron is set in motion at the will of the operator in the direction indicated, feeding the load slowly to the rear and to the beater, likewise carrying the end-rack 12 therewith and feeding the load as a whole, regardless of the looseness of the contents of the load. When the load has been discharged and the end-rack has reached the rear of the spreader-box, rollers 21 will be carried up the cam-faces 23, thus disengaging the catches 16 from notches 17 and allowing the apron to continue its movement, the end-rack coming to rest through the contact of ends 20 with stops 110

24. When it is desired to reload the spreader, the end-rack is raised, pivoted in rollers 21, to bring catches 16 clear of the apron, and the end-rack is then easily pulled to its original position at the front of the spreader.

With an attachment of this sort it will be readily seen that a fertilizer distributer of the common type can be easily and quickly converted into a spreader adapted to distribute straw, chaff, etc. Furthermore, the spreader once set in motion operates automatically, that is, the end-rack and apron are moved to discharge the load and when said end-rack has reached the end of the spreader-box it is rendered inoperative so as not to collide with the beater, without affecting the movement of the apron, which may continue its movement ineffectively.

I claim as my invention—

1. In a fertilizer distributer, the combination with a body having side-boards, distributing means at the rear portion of the body and an apron movable toward said distributing means, of an end-rack located intermediate the side-boards, having base members extending forward and rearward of the rack body, the rearward base members being detachably engageable with the apron, each end of the rack having a rearwardly extending arm carrying at its rearward end a roller, and each side-board having a track upon which a roller is located, the tracks guiding the rack with its base members engaged with the apron, and a raise in each track adjacent the distributing means for raising said arms and effecting the disengaging of said rearward base members from the apron.

2. In a fertilizer distributer, the combination with distributing means and an apron movable toward same, of an end-rack mounted upon the apron through means of runners, the end-rack having a member detachably engageable with the apron and having at each base-end portion a rearwardly extending arm carrying a roller at its rearward end, tracks at the apron sides in which the rollers are slidable to hold the end-rack operatively in engagement with the apron, and said tracks being raised adjacent the distributing means whereby said rollers will be guided to raise the end-rack upon its runners and disengage its member from the apron.

3. In a fertilizer distributer, the combination with distributing means and an apron movable toward same, of an end-rack mounted upon the apron through means of runners, the end-rack having a member detachably engageable with the apron and having at each end thereof a roller, tracks at the apron sides in which the rollers are slidable, the tracks maintaining the rack in engagement with the apron and having a raise adjacent the distributing means to guide the rollers to a raised position and raise the rack from its apron member-engagement.

4. In a fertilizer distributer, the combination with distributing means and an apron movable toward same, of an end-rack mounted through means of runners extending lengthwise of the apron, the end-rack having at each end an arm carrying a guide rearward of the runner rear ends and a member detachably engageable with the apron, tracks for holding said guides from raising movement and with said member in engagement with the apron during the greater part of the movement of the apron toward the distributing means, and raises in the tracks adjacent the distributing means for rocking the end-rack upon its said runner ends to effect the disengaging of the said rock member from the apron.

5. In a fertilizer distributer, an apron end-rack comprising, a vertically disposed rack, runners adjacent each end of the rack extending forwardly therefrom and providing the mounting of the rack, an arm at each end of the rack, extending rearwardly therefrom and carrying a roller, a track at each end of the rack for guiding the rollers, means for engaging the rack with the apron during the greater part of the rack movement toward the distributing means, and means for positively guiding the rollers to rise from the track plane at a predetermined point in the passage of the apron, thereby rocking the end-rack upon its runner ends and effecting the disengaging of said rack and apron engaging means.

In testimony whereof I have hereunto set my hand in presence of two subscribing witnesses.

CALVIN R. DAVIS.

Witnesses:
L. C. TREADWELL,
R. H. SAVAGE.